MAGNETIC RECORDING MEDIUM
Filed Feb. 12, 1969
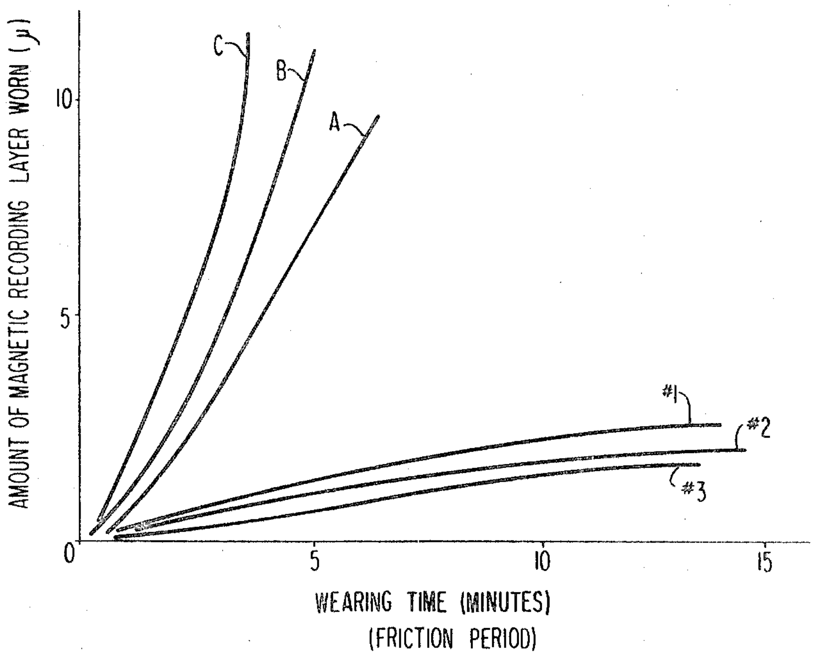
INVENTORS
GORO AKASHI
YASUYUKI YAMADA
BY Sughrue, Rothwell, Mion, Zinn & Macpeak
ATTORNEYS 3,597,273
Patented Aug. 3, 1971

3,597,273

MAGNETIC RECORDING MEDIUM

Goro Akashi and Yasuyuki Yamada, Odawara-shi, Japan, assignors to Fuji Photo Film Co., Ltd., Kanagawa, Japan Filed Feb. 12, 1969, Ser. No. 798,642
Claims priority, application Japan, Feb. 12, 1968, 43/8,705
Int. Cl. H01f *10/02*
U.S. Cl. 117—235 4 Claims

ABSTRACT OF THE DISCLOSURE

In a magnetic recording medium, there is provided a magnetizable layer comprising magnetizable particles dispersed in a binder, said binder comprising a copolymer of vinyl chloride and vinyl acetate, an epoxy resin and a polyisocyanate.

BACKGROUND OF THE INVENTION

Field of the invention

This invention relates to a magnetic recording medium and, more particularly, it is concerned with the composition of a binder in which magnetizable particles are dispersed to yield a magnetic recording medium excellent in surface smoothness, wear resistance and traveling durability which is preferably used as a video tape or a magnetic recording tape for computer usage.

Description of the prior art

In commonly used magnetic recording media such as audio tape and video tape, magnetizable particles are coated onto a film support of synthetic resin, such as polyethylene terephthalate, cellulose diacetate, cellulose triacetate or polyvinyl chloride in a binder, such as vinyl chloride-vinyl acetate (as Vinylite resin, manufactured by the Union Carbide Corporation), polybutyl acrylate or polymethyl methacrylate. However, these binders have several disadvantages as they are composed mainly of a thermoplastic resin, such as these binders are easily dissolved in organic solvents such as esters and ketones; are markedly attacked by aromatic hydrocarbons; and do not have a durability sufficient for use as such media, considering their temperature and humidity dependence. This is due to the fact that none of the ingredients have a three-dimensional network as their chemical structure. In a video tape or tape for use in an electronic computer, in particular, wearing and stripping of a magnetic recording layer of such a medium will occur and "dropout" is caused by dust, resulting in inferior and unfavorable phenomena tend to occur due to changes in temperature and humidity.

SUMMARY OF THE INVENTION

We, the inventors, have made efforts to solve the above problems of the known magnetic recording media, and found that a composition comprising a copolymer of vinyl chloride and vinyl acetate, an epoxy resin and a polyisocyanate can be used as the foregoing binder with excellent results.

It is the principal object of the invention to provide a magnetic recording medium having excellent durability and surface smoothness.

BRIEF DESCRIPTION OF THE DRAWING

The drawing is a graph wherein the wearing time of a series of magnetizable layers is plotted as the horizontal coordinate (minutes) against the quantity of the sample tape which is worn, plotted as the vertical coordinate, the unit utilized being minutes. The samples of the invention and comparative samples are plotted.

DESCRIPTION OF THE PREFERRED EMBODIMENTS

More specifically, this invention provides a magnetic recording medium comprising a support and a magnetizable layer provided thereon composed of magnetizable particles dispersed in a binder, wherein said binder is composed of a copolymer of vinyl chloride and vinyl acetate an epoxy resin and a polyisocyanate.

One process for obtaining the magnetic recording medium of the invention consists in adequately dispersing magnetizable particles in a solution of said copolymer and said epoxy resin (dissolved in a solvent) adding polyisocyanate thereto immediately before coating to prepare a coating solution, coating the coating solution onto a support such as a plastic film, a metal sheet or a metal foil and drying. Of course, the present invention is not intended to be limited thereby, but the foregoing mixing procedure or order may be optionally varied.

With respect to the copolymer used in the invention, a great number of commercially available copolymers are known. To understand and to practice the invention, these copolymers will now be presented. The most typical ones are the "Vinylite" series (trade name) manufactured by the Union Carbide Corporation. "Vinylite" copolymers have the following composition:

| "Vinylite" | Wt. percent | | Degree of copolymerization |
|---|---|---|---|
| | Vinyl chloride | Vinyl acetate | |
| VYLF | 87 | 13 | 160 |
| VYHH | 87 | 13 | 450 |
| VYNS | 90 | 10 | 800 |
| VYDR | 95 | 5 | 1,550 |
| VYNW | 96.5 | 3.5 | ----------- |
| VMCH [1] | 86 | 13 | 450 |
| VAGH [2] | 91 | 3 | 500 |

[1] Containing 1% of maleic anhydride.
[2] Containing 2.3% of —COOH group of maleic acid.

Using these compositions of "Vinylite" as a standard, a number of companies or corporations in the world manufacture such copolymers, for example, "Eslec A" corresponding to the composition of "Vinylite VAGH"; "Eslec C" (trade name; manufactured by the Sekisui Chemical Co., Ltd.) corresponding to the composition of "Vinylite VYHH"; "Geon" (trade name; manufactured by the B. F. Goodrich Chemical Co. and manufactured by the Japan Geon Co., Ltd.).

In the invention, the most preferred copolymer contains 20% or less of vinyl acetate. A copolymer containing more vinyl acetate is not suitable for use as an ingredient of a binder for the magnetizable layer due to a low softening point which causes deterioration of durability. On the other hand, a copolymer containing a very small amount of vinyl acetate or one consisting substantially only of polyvinyl chloride gives a less flexible magnetizable layer, so at least 3% by weight vinyl acetate must be contained therein.

The epoxy resin used in the invention can be made by the condensation of epichlorohydrin with bisphenol A; a condensation product obtained by reacting a polyhydric phenol such as bisphenol A with ethylene oxide or propylene oxide in the presence of an alkaline or acidic catalyst, a dilenic acid, a polyalkylene glycol such as polyethylene glycol or polypropylene glycol, novolac resin, bisphenol F, tetrachlorobisphenol A, diphenolic acid, butadiene, bisphenol S, bisphenol V and peracetic acid. These epoxy resins are commercially sold as products bearing trademarks such as "Epikote" (Shell Chemical Co.), "Araldite" (Ciba, Ltd.) "DER" (Dow Chemical Co.), "ERL" (UCC Plastics Co.), and "ADK Ep" (Asahi Denka Co., Japan). The weight per epoxy equivalent required for such an epoxy resin is preferably within the range of 130–330. When the weight per epoxy equivalent is more than 330, the epoxy resin is solid at normal temperature, being often hardly soluble in solvents, and does not give a coating of sufficient softness, though it dissolves in solvent. When the equivalent is less than 130, the durability of the coating deteriorates because the molecular weight is too small.

As the polyisocyanate, there are a number of varieties, for example, aliphatic diisocyanates, aliphatic diisocyanates having a cyclic group, aromatic diisocyanates, naphthalene isocyanate, biphenyl isocyanate, di-or triphenylmethane diisocyanate, triisocyanate, or tetraisocyanate, etc. Typical or the commercially manufactured isocyanates are tolylene di-isocyanate, 3,3′-bitolylene diisocyanate, diphenylmethane-4,4′-diisocyanate, 3,3′-dimethyldiphenylmethane-4,4′-diisocyanate, a dimer of 2,4-tolylene diisocyanate, methaphenylene diisocyanate, triphenylmethane-4,4′,4″-triisocyanate and hexamethylene diisocyanate.

The copolymer and epoxy resin used as the ingredients of the binder of the invention have such a relation in quantity that, as the proportion of the copolymer is increased, the dispersibility of magnetizable particles is raised, while durability (such as heat and solvent resistance) deteriorates. As the proportion of epoxy resin is increased, the durability is raised whereas the dispersibility of magnetizable particles lowers, resulting in the problem that there will not be sufficient orientation of the particles due to a magnetic field. It is apparent from the foregoing relation that the compounding ratio of the copolymer and epoxy resin must be within a range of 2:8–7:3. It is desirable to determine the addition proportion for the polyisocyanate according to a relationship with the quantity of the epoxy resin.

Since the features of the invention lies, in particular, in the composition of the binder, any material known in the art may be used for the magnetizable particles. As such materials, there can be used $\gamma$-$Fe_2O$, $Fe_3O_4$, Co- containing $\gamma$-$Fe_2O_3$, Co-containing $Fe_3O_4$, $Zn_xFe_{(1-x)}Fe_2O_4$, $CrO_2$, Sb- or Te-containing $CrO_2$, Fe-Co-Ni, Fe-Co-Cu and Co-Ni alloy in a powdered from. The size of the particles is generally about less than 2 microns. The smaller the size, the higher will be the characteristics of a magnetic recording medium obtained.

The following examples, in which all references to proportions are to be taken as references to proportions by weight, are given in order to illustrate the invention in detail without limiting the same.

EXAMPLE 1

| | Parts |
|---|---|
| Magnetizable powder: $\gamma$-$Fe_2O_3$ | 300 |
| Copolymer of vinyl chloride and vinyl acetate: "Vinylite VYHH" (trade name; copolymerization ratio 87:13; manufactured by Union Carbide Corporation, USA) | 25 |
| Epoxy resin "Epikote 827" (trade name; weight weight per epoxy equivalent 175–210; manufactured by Shell Chemical Corporation, USA) | 25 |
| Graphite powder | 15 |
| Nonionic active surfactant: "Ionet K" (trade name; manufactured by Sanyo Chemical Industries Ltd., Japan) | 15 |
| Lecithin | 5 |
| Flourine-containing resin oil (low polymerized product having a repeated unit of —($CF_2$—CFCl)—, oily) | 3 |
| Methyl isobutyl ketone | 275 |
| Toluene | 275 |

The ingredients of the foregoing composition were charged to a ball mill and mixed to disperse the magnetizabe particles. 18 parts of "Desmodur L-75" (Trade name; polyisocyanate; manufactured by Bayer Co. Germany) was then added and dispersed uniformly, and the resulting coating solution was applied to a polyethylene terephthalate film 25 microns thick to a thickness of 10 microns on the dry base. The resulting coated film was subjected to high infrared radiation to cure the epoxy resin and the polyisocyanate, to a supercalender for surface glazing of the magnetizable layer and then slit into a width of 2 inches to provide a video tape, Sample 1.

EXAMPLE 2

| | Parts |
|---|---|
| Magnetizable particles: $\gamma$-$Fe_2O_3$ | 300 |
| Copolymer of vinyl chloride and vinyl acetate containing maleic acid: "Vinlite VAGH" (trade name; copolymerization ratio 91.3; containing 2.3% of maleic acid as —COOH group; manufactured by Union Carbide Corporation USA) | 25 |
| Lecithin | 5 |
| Nonionic active surfactant: "Ionet K" (aforementioned) | 15 |
| Flourine-containing resin oil (aforementioned) | 3 |
| Methyl isobutyl ketone | 225 |
| Toluene | 225 |

The ingredients of the foregoing composition were dispersed uniformly in a ball mill, uniformly mixed with 8 parts of 2,4-tolylene diisocyanate and the resulting coating composition was applied to a polyethylene terephthalate film 25 microns thick to yield a thickness of 12 microns on a dry base. The resulting coated film was held at 90° C. for 12 hours to cure the epoxy resin and the polyisocyanate, subjected to a glazing treatment of the formed coating layer and slit into a width of ½ inch to provide a magnetic recording tape for a computer, Sample 2.

EXAMPLE 3

| | Parts |
|---|---|
| Magnetizable particles: $Fe_3O_4$ | 300 |
| Copolymer of vinyl chloride and vinyl acetate: "Geon 400 x 110 A" (trade name; manufactured by Nippon Geon Co., Japan) | 30 |
| Epoxy resin: 'Epikote 828" (Trade name; weight per epoxy equivalent 175–210; manufactured by Shell Chemical Corporation) | 30 |
| Carbon black | 13 |
| Nonionic active surfactant (aforementioned) | 15 |
| Lecithin | 5 |
| Fluorine-containing resin oil (aforementioned) | 3 |
| Methyl isobutylene ketone | 225 |
| Toluene | 225 |

The ingredients of the foregoing composition were treated as in Example 1, and 15 parts of "Desmodur L-75" (aforementioned) was then added and uniformly dispersed. The resultant coating composition was coated onto a polyethylene terephthalate film (25 microns thick) to a thickness of 3 microns and dried. The resulting coated film was subjected to a supercalender to glaze the coating layer and slit into a width of ¼ inch to provide a tape, Sample 3.

The following comparative examples (relating to known tapes) are given for comparison with the characteristics of the magnetic recording tapes obtained in the foregoing examples of the invention with those of the known tapes.

COMPARATIVE EXAMPLE A

| | Parts |
|---|---|
| Magnetizable particles: $\gamma$-$Fe_2O_3$ | 300 |
| Copolymer of vinyl chloride and vinyl acetate: "Geon 400 x 110 A" (trade name; manufactured by Nippon Geon Co., Japan) | 30 |
| Epoxy resin: "Epikote 828" (trade name; weight per epoxy equivalent 175–210: manufactured by Shell Chemical corporation U.S.A.) | 30 |
| Carbon black | 13 |
| Nonionic active surfactant (aforementioned) | 15 |
| Lecithin | 5 |
| Fluroine-containing resin oil (aforementioned) | 3 |
| Methyl isobutylene ketone | 225 |
| Toluene | 225 |

The ingredients of the foregoing composition were treated as in Example 1, and 15 parts of "Desmodur L-75" (aforementioned) was then added and uniformly dispersed. The resulting coating composition was coated onto a polyethylene terephthalate film (25 microns thick) to a thickness of 3 microns and dried. The resulting coated film was subjected to a supercalender to glaze the coating layer and slit into a width of ¼ inch to provide a tape, Sample 3.

The following Comparative Examples (relating to known tapes) are given for comparison with the characteristics of the magnetic recording tapes obtained in the foregoing examples of the invention with those of the known tapes.

COMPARATIVE EXAMPLE A

| | Parts |
|---|---|
| Magnetizable particles: $\gamma$-$Fe_2O_3$ | 300 |
| Vinyl chloride-vinyl aceate copolymer, "Vinylite VYHH" (trade name; manufactured by Union Carbide Corporation, U.S.A.) | 125 |
| Dibutyl phthalate | 15 |
| Castor oil | 8 |
| Antistatic agent "Sansta 1007" (trade name; manufactured by Sanyo Chemical Industries Ltd.) | 10 |
| Lecithin | 5 |
| Butyl acetate | 450 |
| Toluene | 150 |

Using the ingredients of the foregoing composition, a magnetic recording tape, Sample A was prepared by procedures as those of the foregoing examples.

COMPARATIVE EXAMPLE B

| | Parts |
|---|---|
| Magnetizable particles: $\gamma$-$Fe_2O_3$ | 300 |
| Nitrocellulose "RS 1/2 (trade name; manufactured by Daicel Ltd.) | 70 |
| Dibutyl phthalate | 20 |
| Lecithin | 8 |
| Anionic active surfactant "Sanstat No. 6" (trade name; manufactured by Sanyo Chemical Industries Ltd.) | 10 |
| Fluorine-containing resin oil (aforementioned) | 5 |
| Butyl acetate | 450 |
| Toluene | 150 |

Using the ingredients of the foregoing composition, Sample B was prepared as in the foregoing examples.

COMPARATIVE EXAMPLE C

| | Parts |
|---|---|
| Magnetizable particle: $\gamma$-$Fe_2O_3$ | 300 |
| Polyvinyl acetate "S-nyl" (trade name; manufactured by Sekisui Chemical Co., Ltd.) | 120 |
| Lecithin | 5 |
| Antistatic agent "Sansta 1007" (trade name; manufactured by Sanyo Chemical Industries Ltd.) | 10 |
| Fluorine-containing resin oil (aforementioned) | 6 |
| Butyl acetate | 450 |
| Toluene | 150 |

Using the ingredients of the foregoing composition, Sample C was prepared as in the foregoing examples.

The drawing is a graph comparing the wear resistance of the magnetic recording media prepared in the foregoing examples and in comparative examples. The horizontal coordinate represents the time for wearing (unit: minutes), and the vertical coordinate represents the quantity worn of the sample tape (unit: $\mu$). Each curve of the graph is representative of measured values marked.

As is evident from the drawing, about 10–20 minutes or more are required for wearing the magnetic recording tape of the invention in a quantity corresponding to that wherein the magnetic recording tapes of the comparative examples are worn in a wearing time of 1–2 minutes. That is to say, in accordance with this invention, the smoothness and wear resistance of a magnetic layer of a magnetic recording tape are improved at least ten times over those of the prior art. It will readily be understood that this shows a durability ratio for magnetic recording tapes, so that the practical meaning of the invention is very important. The magnetic recording tape of this invention has excellent features in respect to its wear resistance and surface smoothness over the art using ordinary binders.

To further define the present invention, it has been found most preferred that the copolymer illustrate a degree of polymerization within the range 300–800.

As heretofore indicated, it is most desirable to determine the addition proportion for the polyisocyanate according to a relationship with the quantity of the epoxy resin. To further define the amount of polyisocyanate which is required, this has been found to be most preferably 30–80% polyisocyanate, based on the epoxy (by weight).

As heretofore indicated, the epoxy and the polyisocyanate do cross link with each other. For instance, this may be by the described heating step, generally to a temperature in the range of 90° C. Once the specific compounds of the present invention are disclosed, in view of the discussion relating to cross-linking earlier in the specification, it is felt that one skilled in the art can easily appreciate the parameters required depending upon the article under manufacture. Further, the amount of magnetizable particles in the binder of the present invention is generally considered to be non-critical. Generally, amounts utilized by the prior art tapes are acceptable. For instance, the following is an average, but by no means limiting, compositions: 300 magnetizable particles, 70–150 binder, 600–800 solvent.

Further, with respect to the thickness of the binder or magnetizable layer of the present invention, this has been found to be non-critical and the thickness of the prior art may be used in the present invention. Generally, however, it has been found that the thinner the magnetizable layer, the more improved the final results are.

A number of subsidiary materials are disclosed in the specification in the examples which are not essential to the present invention. For instance, lecithin is used in the examples as a dispersing agent for the magnetizable particles. Carbon black utilized therein serves to improve the surface contactivity and reduce noise of the tape. The castor oil serves as a softening agent, the silicone oil serves as a defoaming agent, and the fluorinated oil serves to improve heat resistance and lubrication.

What is claimed is:

1. A magnetic recording medium comprising a support and a magnetizable layer provided thereon comprising magnetizable particles dispersed in a binder, said binder consisting essentially of (1) the copolymer of vinyl chloride and vinyl acetate wherein said copolymer contains from 3 to 20% of vinyl acetate and (2) an epoxy resin crosslinked with from 30 to 80% by weight, based on the weight of said epoxy resin of a polyisocyanate, wherein the weight ratio of said copolymer to said epoxy resin varies from 2:8 to 7:3.

2. A magnetic recording medium as in claim 1 wherein the degree of polymerization of said copolymer varies from 300 to 800.

3. A magnetic recording medium according to claim 1 wherein said epoxy resin is the condensation product of bisphenol A and epichlorohydrin.

4. A magnetic recording medium according to claim 1 wherein said polyisocyanate is a member selected from the group consisting of tolylene diisocyanate, 3,3'-bitolylene diisocyanate, diphenylmethane-4,4'-diisocyanate, 3,3' - dimethyldiphenylmethane-4,4'-diisocyanate, methaphenylene diisocyanate, triphenylmethane - 4,4',4''-triisocyanate and hexamethylene diisocyanate.

References Cited

UNITED STATES PATENTS

| | | | |
|---|---|---|---|
| 3,357,855 | 12/1967 | Bisschops et al. ---- | 117—235 |
| 3,397,178 | 8/1968 | Shackelford et al. -- | 260—830X |
| 3,460,984 | 8/1969 | Bisschops et al. -- | 117—161UX |
| 3,472,798 | 10/1969 | Pitchforth et al. ---- | 117—161X |
| 3,475,356 | 10/1969 | Davis et al. --------- | 260—13 |

WILLIAM D. MARTIN, Primary Examiner

B. D. PIANALTO, Assistant Examiner

U.S. Cl. X.R.

117—161; 252—62.54; 260—13, 858